United States Patent
Price et al.

(10) Patent No.: US 7,285,171 B2
(45) Date of Patent: Oct. 23, 2007

(54) ANTI-FILMING MATERIALS, COMPOSITIONS AND METHODS

(75) Inventors: Kenneth Nathan Price, Wyoming, OH (US); Penny Sue Dirr, Erlanger, KY (US); Jeffrey John Scheibel, Loveland, OH (US); Diane Barbara Parry, Cincinnati, OH (US); Leslie Dawn Waits, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 324 days.

(21) Appl. No.: 10/731,333

(22) Filed: Dec. 9, 2003

(65) Prior Publication Data

US 2004/0121928 A1 Jun. 24, 2004

Related U.S. Application Data

(60) Provisional application No. 60/435,065, filed on Dec. 19, 2002.

(51) Int. Cl.
- C02F 5/00 (2006.01)
- C02F 5/08 (2006.01)
- B08B 3/04 (2006.01)
- C11D 3/37 (2006.01)

(52) U.S. Cl. ............ 134/42; 134/25.2; 134/25.3; 510/220; 510/223; 510/228; 510/230; 510/361; 510/470; 510/475; 510/492; 510/505; 510/531; 252/175

(58) Field of Classification Search .......... 510/220, 510/223, 228, 230, 361, 470, 475, 492, 505, 510/531; 134/25.2, 25.3, 42; 252/175
See application file for complete search history.

(56) References Cited

U.S. PATENT DOCUMENTS

| | | | |
|---|---|---|---|
| 3,320,237 A | 5/1967 | Greidinger et al. | |
| 3,716,488 A | 2/1973 | Kolsky et al. | |
| 3,784,475 A | 1/1974 | Diehl | |
| 4,146,495 A | 3/1979 | Crutchfield et al. | |
| 5,104,584 A * | 4/1992 | Kong | 510/309 |
| 5,368,766 A | 11/1994 | Dixit | |
| 5,516,432 A | 5/1996 | King et al. | |
| 5,547,612 A | 8/1996 | Austin et al. | |
| 5,591,703 A | 1/1997 | Sadlowski | |
| 5,698,512 A | 12/1997 | Austin et al. | |
| 5,904,161 A | 5/1999 | Rai et al. | |
| 6,071,434 A | 6/2000 | Davis et al. | |
| 6,194,368 B1 | 2/2001 | Waschenbach et al. | |
| 6,210,600 B1 | 4/2001 | Zhou et al. | |
| 6,326,343 B1 | 12/2001 | Ghatlia et al. | |
| 6,395,185 B1 | 5/2002 | Gauthier et al. | |
| 6,433,061 B1 | 8/2002 | Marchant et al. | |
| 2002/0077264 A1* | 6/2002 | Roberts et al. | 510/296 |
| 2002/0103095 A1* | 8/2002 | Becker et al. | 510/305 |

FOREIGN PATENT DOCUMENTS

| | | |
|---|---|---|
| EP | 0 781 837 A1 | 12/1996 |
| EP | 0 893 491 A1 | 7/1998 |
| GB | 1 1284 680 | 8/1972 |
| WO | WO 95/32272 | 11/1995 |
| WO | WO 99/39045 | 8/1999 |
| WO | WO 00/22079 | 4/2000 |
| WO | WO 01/72941 A1 | 10/2001 |
| WO | WO 01/96514 A1 | 12/2001 |
| WO | WO 02/20708 A1 | 3/2002 |
| WO | WO 02/34869 A1 | 5/2002 |
| WO | WO 02/34870 A1 | 5/2002 |
| WO | WO 2004/061067 A2 * | 7/2004 |

OTHER PUBLICATIONS

Heinze, T., Vieira, M., & Heinze, U., New Polymers Based on Cellulose, Institute of Organic Chemistry and Macromolecular Chemistry, Friedrich Schiller University of Jena, Humboldstrasse 10, D-07743 Jena, Germany, pp. 39-44, no date given.

* cited by examiner

*Primary Examiner*—Brian Mruk
(74) *Attorney, Agent, or Firm*—Laura R. Grunzinger

(57) ABSTRACT

Anti-filming compositions and methods are provided. More particularly, compositions and methods for inhibiting film formation on surfaces, especially hard surfaces such as dishware, tableware and glassware, and soft surfaces such as fabrics and textiles are provided.

12 Claims, No Drawings

ANTI-FILMING MATERIALS, COMPOSITIONS AND METHODS

CROSS REFERENCE TO RELATED APPLICATIONS

This application claims priority under 35 U.S.C. §119(e) from Provisional Application Ser. No. 60/435,065, filed on Dec. 19, 2002.

FIELD OF THE INVENTION

The present invention relates to anti-filming compositions and methods. More particularly, the present invention relates to compositions and methods for inhibiting film formation on surfaces, especially hard surfaces such as dishware, tableware and glassware, and soft surfaces such as fabrics and textiles.

BACKGROUND OF THE INVENTION

A well-known problem in regions having hard water (i.e., water comprising a high level of Calcium and/or Magnesium ions) is the formation of scale deposits. Particularly in applications where there are high levels of carbonate and/or phosphate ions the formation of Ca/Mg scales of these species can lead to buildup which prevents heat transfer, restricts or disrupts fluid flow, decreases the operating lifetime or efficiency of equipment, causes unsightly residue ("film"), or combinations thereof. Here and elsewhere, the term "carbonate scale" and "phosphate scale" refer to salts of these species with calcium, magnesium, or other metal ions that are not fully soluble in the conditions in question.

Carbonate and phosphate scale are particularly troublesome in machine dishwashing applications because they lead to unsightly residues, or films, on dishware, tableware and especially glassware. This phenomenon is widely known as "hard water film". In general, the presence of phosphate and carbonate are desirable in such formulations because of their cleaning power or building power, so they cannot simply be removed from the formula. Hence, "anti-filming technologies" to reduce the formation of carbonate or phosphate scale in automatic dishwashing have been extensively described in the literature.

Typically such anti-filming technologies have comprised polycarboxylates such as polyacrylates, polymethyacrylates, etc. as described in U.S. Pat. No. 5,591,703 and references described therein. Polycarboxylate technologies significantly assist in the reduction of hard water filming in automatic dishwashing, as well as in more general water treatment applications.

Another class of anti-filming materials to reduce phosphate and carbonate scale is the sulfonate/carboxylate copolymers as described in U.S. Pat. No. 5,547,612, U.S. Pat. No. 6,395,185 and references described therein. Commercially available examples of such polymers include Alcosperse® 240 (Alco Chemical), and Acusol® 586 (Rohm & Haas).

The copolymers described in the art are typically derived from combinations of sulfonate-containing and/or carboxylate-containing ethylenically unsaturated monomers, such as acrylic acid, methylallylsulfonic acid, ethoxylate esters of acrylic acids, and variations thereof. A wide variety of such monomers, additional nonionic and/or cationic comonomers, and combinations have been described in the art. The sulfonated monomer is expensive and is the major contributor to the high cost of the polymer containing it. As a result of these polymers' high cost, their application in automatic dishwashing detergents remains limited.

There is a long-standing need for these polymers to become more cost-effective so that they may be used more generally in automatic dishwashing detergents. In addition, though the water-treatment industry has been better able to afford conventional carboxylate/sulfonate functionalized acrylate-type materials, there is also a general need for more cost-effective polymers in this area as well, in order to render plant and other operations more economical.

Further, it is desirable to derive these anti-filming polymers from natural sources that are cheap, plentiful and preferably renewable, such as plants, animals or bacteria.

It has now been surprisingly discovered that effective sulfonate/carboxylate materials for anti-scaling, anti-filming and anti-spotting benefits can be derived by using relatively inexpensive polymeric or oligomeric "templates" and post-functionalizing them with the appropriate carboxylate, sulfonate, and nonionic functionalities.

SUMMARY OF THE INVENTION

In one aspect of the present invention, it relates to a method for inhibiting scale, film and/or spot formation on a surface treated with an aqueous solution containing calcium and/or magnesium ions, the method comprising contacting the surface with a wash medium comprising the aqueous solution and a composition containing a functionalized material, wherein the functionalized material can be derived from non-ethylenic based polymers or oligomers, or vinyl polymers or oligomers, and the functionalized material satisfies Test Protocol I.

In another aspect of the present invention, it relates to a composition for inhibiting scale, film and/or spot formation on a surface treated with an aqueous solution containing calcium and/or magnesium ions, the composition comprising:

a) a functionalized material produced by a process comprising functionalizing a non-ethylenic based or vinyl based material with a functional moiety such that the functionalized material satisfies the Test Protocol I;

b) a builder; and c) one or more adjunct ingredients.

In yet another aspect of the present invention, it relates to a functionalized material derived from a non-ethylenic based material or a vinyl based material, wherein the functionalized material has the formula:

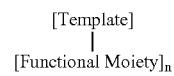

wherein the functional moiety is independently selected from the group consisting of: sulfonate moieties, carboxylate moieties and mixtures thereof; n is from 1 to about 2000; the template is a non-ethylenic based polymer or oligomer or a vinyl based polymer or oligomer; such that the functionalized material satisfies the Test Protocol I.

DETAILED DESCRIPTION OF THE INVENTION

Definitions

The term "surface" as used herein refers to any inanimate surface such as hard surfaces and/or soft surfaces. Nonlimiting examples of hard surfaces include dishware, tableware, glassware, countertops, mirrors and automobiles. Nonlimiting examples of soft surfaces include fabric and textiles.

The term "oligomer" as used herein refers to a molecule having only a few (preferably no less than about 2) monomer units, and the term "polymer" as used herein refers to a molecule having considerably more (preferably greater than about 5) monomer units. For the present invention, oligomers are defined as molecules having a weight-average molecular weight below about 1,000 daltons and polymers are molecules having a weight-average molecular weight of greater than about 1,000 daltons, preferably from about 10,000 up to about 10,000,000 daltons, more preferably from about 50,000 to about 1,000,000 daltons. The "weight-average molecular weight" is determined using gel permeation chromatography according to the protocol found in "Colloids and Surfaces A Physico Chemical & Engineering Aspects", Vol. 162, 2000, pg. 107-121. All molecular weights of polymers or oligomers herein refer to the weight-average molecular weights.

The term "material" as used herein refers to a material that satisfies the following Test Protocol I, wherein the material comprises a template (such as a non-ethylenic based or vinyl based polymer or oligomer) upon which functional groups, such as sulfonate and/or carboxylate groups, may be added (i.e., bonded) to the template. The resulting material suitable for use herein (i.e., satisfies Test Protocol I) may have the formula:

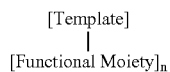

wherein the functional moiety is independently selected from the group consisting of: sulfonate moieties, carboxylate moieties, nonionic moieties and mixtures thereof; and n is from 1 to about 2000, preferably from about 2 to about 1000, more preferably from about 2 to about 500.

The term "non-ethylenic based materials", as used herein refers to polymers and/or oligomers derived from non-petroleum based sources, which include but are not limited to starch, saccharides, proteins and/or polyamino acids, lignins and cellulosics.

The term "vinyl based materials" as used herein, refers to polymers and/or oligomers that include but are not limited to polymers and/or oligomers derived from vinyl alcohol, vinyl acetate, vinyl chloride, and mixtures thereof. It is understood that the "vinyl based materials" specifically exclude those polymers and/or oligomers derived from (A) vinyl monomers having carbonyl groups directly attached to one of the vinyl carbon atoms, such as acrylates, alkylacrylates and derivatives thereof; or (B) vinyl monomers having sulfonate groups directly or indirectly attached to one of the vinyl carbon atoms. Exemplary monomers having structures A and B are shown below, wherein R is hydrogen, C1-C18 alkyl, C1-C18 aryl or alkylaryl, oxyalkyl, C(O)OR, hydroxyalkyl, and mixtures thereof; X is C1-C18 alkylene, aryl, arylene, arylalkylene, amino(alkyl)alkylene, aminoalkylene, oxyalkylene, and n is 0-100. Examples of monomers of the type A would include those based on acrylic acid or derivatives, such as acrylic acid, methacrylic acid, ethacrylic acid, maleic acid, methylmethyacrylate, and salts thereof. Examples of monomers of the type B would include methylallyl sulfonic acid, allylsulfonic acid, allyloxybenzenesulfonic acid, 2-acrylamido-2-methylpropanesulfonic acid, and salts thereof. Additional ethylenic monomers containing carboxylate or sulfonate functionality are described in U.S. Pat. No. 5,547,612 and U.S. Pat. No. 6,395,185B1.

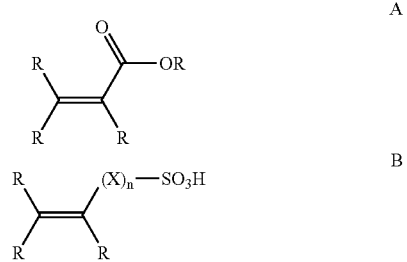

The term "functionalized Material" as used herein refers to a material that contains one or more functional moieties, such as sulfonate moieties, carboxylate moieties, nonionic moieties (e.g., alkoxy, alkyl or ester moieties) and mixtures thereof. The functionalized material can also include a minor amount of phosphonate moieties. When present in the functionalized material, the amount of the phosphonate moieties is less than the total amount of the above functional moieties All percentages, ratios and proportions herein are on a weight basis unless otherwise indicated.

Test Protocol I

To determine if a material falls within the scope of the present invention one needs to test a potential material as follows:

Materials and Equipment:
(i) Two (2) Whirlpool Home Dishwasher Model number DU-911-PWB (preferably with closely sequential serial numbers), these are commercially available from Whirlpool Corporation;
(ii) thirty-two (32) Libbey 10-oz #53 clear drinking glasses, which are commercially available from Libbey, Inc.;
(iii) a water supply having a water hardness level of 21 grains per gallon (gpg). The water temperature is set at 120° F. (48.9° C.); and
(iv) a control composition made of the following (in wt % of the composition):

| | |
|---|---|
| 25% | STPP (sodium tripolyphosphate, from Rhodia) |
| 30% | Sodium Carbonate |
| 1% | SLF-18 (nonionic surfactant from Olin, Inc.) |
| 12% | Sodium Silicate ("Britesil H2O" from PQ, Inc) |
| 4% | Sodium Perborate |
| balance | Sodium Sulfate |

Test Procedure

Step 1: Sixteen of the drinking glasses are placed in each of the two (2) dishwashers. In the first dishwasher, the pre-wash and main wash cups of both dishwashers are each loaded with 50 g of the control composition. In the second dishwasher, a test material to be evaluated is added to the control composition (at 2% by weight of the control composition) within both the pre-wash and main wash cups of the dishwasher.

Step 2: The dishwashers are operated through the entire normal dishwasher cycle.

Step 3: Upon completion of the normal dishwasher cycle, the glasses are removed from the dishwashers and placed in a light box for visual grading. The light box is open in the front and has black walls, a rack onto which to place at least one glass at a time, and a light source located beneath said rack such that a filming score for each glass can be determined. This step is repeated until a filming score, as described in Step 4 below, is given for each glass.

Step 4: Determine filming score from 1-5 for each glass, as described in ASTM D3556, wherein the filming score is as following: 1 corresponding to no film, 2 corresponding to barely perceptible film, 3 corresponding to slight filming, 4 corresponding to moderate filming, and 5 corresponding to heavy filming. The grades for the 16 glasses taken from a given dishwasher are averaged; thus, one average grade is reported for control composition-treated glasses and another average grade is reported for the 16 test material-treated glasses. If the test material-treated glasses' average grade is at least 0.75, preferably at least 1, more preferably at least 1.25 units higher than the control composition-treated glasses' average grade, then the test material meets the requirement of being an anti-filming material for purposes of the present invention and the material falls within the scope of the present invention.

Functionalized Materials

In one embodiment of the present invention, the functionalized material is derived from functionalizing a polymeric or oligomeric material (i.e., the template) with one or more functional groups rather than polymerizing functionalized monomers to form the functionalized material.

In another embodiment of the present invention, the polymeric or oligomer material (i.e., the template) may be partially functionalized with one or more functional groups and is capable of further derivatization with one or more functional groups such that the final material contains sufficient functional moieties to satisfy the Test Protocol.

For example, the template material can be a non-functionalized, or partially functionalized material that is capable of further derivatization with one or more functional groups such that the required array of sulfonate, carboxylate, nonionic and/or phosphonate groups is added onto (or bonded with) the template material. Non-limiting examples of such templates include celluloses; modified celluloses, such as carboxymethyl celluloses, cellulose ethers, or other modified celluloses; lignins; starches; saccharides including mono-, di- tri-, oligo- and poly-saccharides; polyamino acids; and polyvinylalcohols.

Yet another aspect of the invention is the tailoring of polymer structural elements for optimal anti-scaling, anti-filming and/or anti-spotting performance.

Exemplary materials A-D having cellulose based templates and materials E-F having polyvinyl alcohol template are shown in the following diagram, wherein R is hydrogen, C1-C18 alkyl, aryl, alkylaryl, polydimethylsiloxane, or $(R^2O)y$, where $R^2$ is C1-C4 alkylene and y is an integer from 1 to 100. The precise nature of R will be chosen by the formulator in accordance with nature of the surface being treated and the nature of the method used.

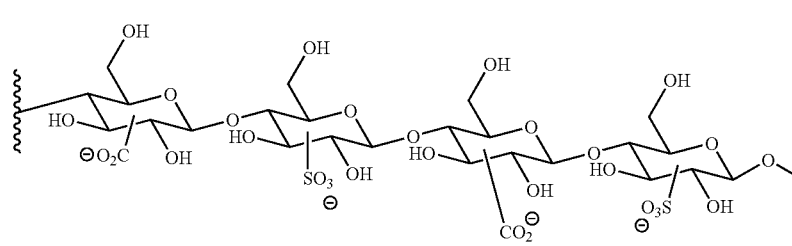

A

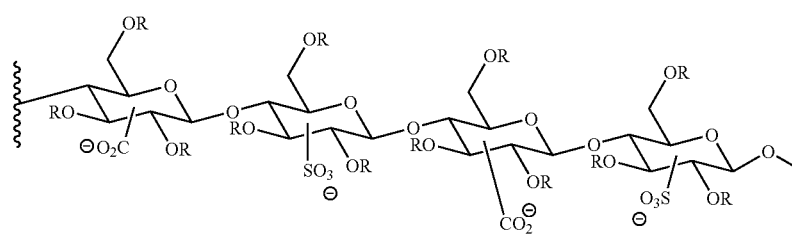

B

-continued

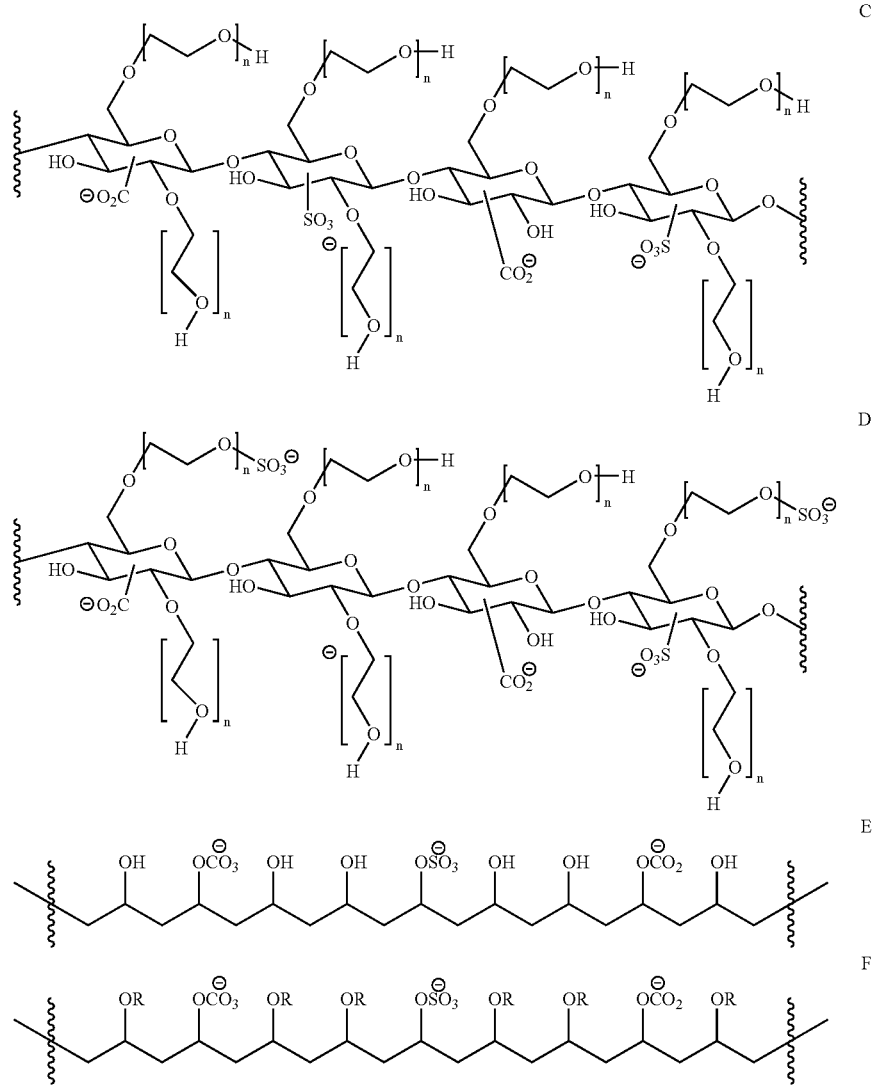

The polymers of the present invention may be used in such applications as boiler or cooling tower additives and detergent compositions. The latter includes automatic and hand dishwashing detergents, rinse aids, and other additives, as well as laundry detergents, rinse-added compositions, and other fabric treatment additives.

Nonlimiting examples of suitable materials for use in the present invention include the following polymers, oligomers and other materials that are capable of being functionalized with sulfonate and/or carboxylate moieties.

In addition to functionalizing the materials with sulfonate and/or carboxylate groups, the materials may also be functionalized with nonionic groups, such as alkoxy groups. Further, the nonionic groups may be alkyl and/or ester groups, if the material contains one or more hydroxyl groups with which the alkyl and/or ester group may react.

In a typical embodiment, the molar ratio of sulfonate to carboxylate groups within the functionalized materials can be from about 1:30 to about 30:1, preferably from about 1:20 to about 20:1, more preferably from about 1:10 to about 10:1. In another typical embodiment, the molar ratio of the anionic groups (sum of sulfonate and carboxylate groups) to nonionic groups within the functionalized materials can be from about 1:20 to about 20:1. In some embodiments where the template comprises carbohydrates containing pre-existing nonionic groups (e.g. hydroxyl substituents), it is not necessary to add additional nonionic substituents to the polymer template prior to fictionalization with sulfonate or carboxylate moieties. In other embodiments where cellulose-based polymer is the template, it may be necessary to modify (e.g., add substituents) the polymer template prior to functionalization.

Template Materials

A. Cellulose-based Polymers/Oligomers

Additional cellulose-based polymer or oligomer materials which are suitable for use herein to provide the desired benefits can be characterized by the following general formula:

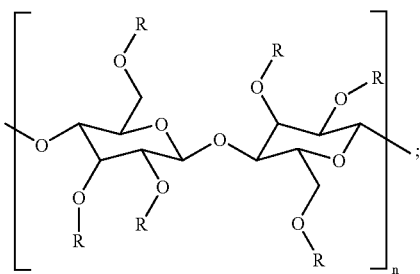

wherein each R is selected from the group consisting of $R_2$, $R_C$, and

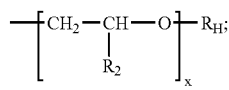

wherein:
each $R_2$ is independently selected from the group consisting of H and $C_1$-$C_4$ alkyl;

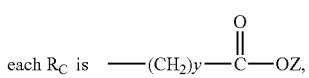

wherein each Z is independently selected from the group consisting of M, $R_2$, $R_C$, and $R_H$;
each $R_H$ is independently selected from the group consisting of $C_5$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $C_1$-$C_{20}$ alkoxy-2-hydroxyalkyl, $C_7$-$C_{20}$ alkylaryloxy-2-hydroxyalkyl, $(R_4)_2$N-alkyl, $(R_4)_2$N-2-hydroxyalkyl, $(R_4)_3$N-alkyl, $(R_4)_3$N-2-hydroxyalkyl, $C_6$-$C_{12}$ aryloxy-2-hydroxyalkyl,

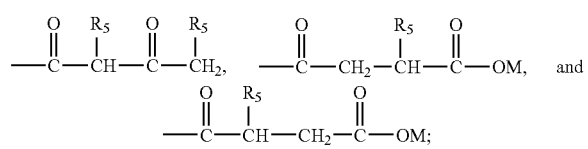

each $R_4$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, aminoalkyl, alkylaminoalkyl, dialkylaminoalkyl, piperidinoalkyl, morpholinoalkyl, cycloalkylaminoalkyl and hydroxyalkyl;

each $R_5$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $(R_4)_2$N-alkyl, and $(R_4)_3$N-alkyl;

wherein:
M is a suitable cation selected from the group consisting of Na, K, 1/2Ca, and 1/2Mg;
x is from 0 to about 5;
y is from about 1 to about 5; and
n is from about 1 to about 100,000;

provided that:
the Degree of Substitution for group $R_H$ is between about 0.001 and 0.1, more preferably between about 0.005 and 0.05, and most preferably between about 0.01 and 0.05;
the Degree of Substitution for group $R_C$ wherein Z is H or M is between about 0.2 and 2.0, more preferably between about 0.3 and 1.0, and most preferably between about 0.4 and 0.7;
if any $R_H$ bears a positive charge, it is balanced by a suitable anion; and
two $R_4$'s on the same nitrogen can together form a ring structure selected from the group consisting of piperidine and morpholine.

The "Degree of Substitution" for group $R_H$, which is sometimes abbreviated herein "$DS_{RH}$", means the number of moles of group $R_H$ components that are substituted per anhydrous glucose unit, wherein an anhydrous glucose unit is a six membered ring as shown above in the repeating unit of the general structure.

The "Degree of Substitution" for group $R_C$, which is sometimes abbreviated herein "$DS_{RC}$", means the number of moles of group $R_C$ components, wherein Z is H or M, that are substituted per anhydrous glucose unit, wherein an anhydrous glucose unit is a six membered ring as shown in the repeating unit of the general structure above. The requirement that Z be H or M is necessary to insure that there are a sufficient number of carboxyl methyl groups such that the resulting polymer is soluble. It is understood that in addition to the required number of $R_C$ components wherein Z is H or M, there can be, and most preferably are, additional $R_C$ components wherein Z is a group other than H or M.

The production of materials according to the present invention is further defined in the Examples below.

B. Modified Starch-based Polymers/Oligomers

Modified starch-based polymer and/or oligomer materials, preferably modified amylose (represented by Formula I below) and/or modified amylopectin (represented by Formula II below) both of which are described in Kirk-Othmer's *Encyclopedia of Chemical Technology* 4th Edition, Vol. 22, pp. 701-703, starch, generally, is described at pp. 699-719, which are suitable for use in laundry and/or fabric care operations and provide the desired fabric appearance and integrity benefits can be characterized by the following general formulas, alone or in combination:

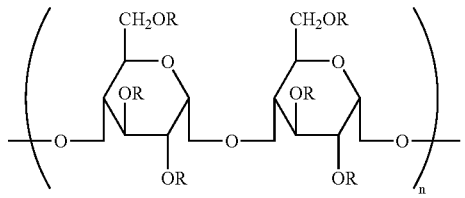

or

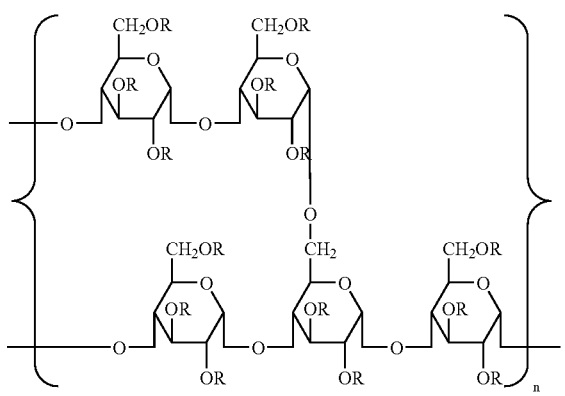

wherein each R is selected from the group consisting of $R_2$, $R_C$, and

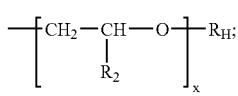

wherein:

each $R_2$ is independently selected from the group consisting of H and $C_1$-$C_4$ alkyl;

each $R_C$ is

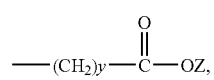

wherein each Z is independently selected from the group consisting of M, $R_2$, $R_C$, and $R_H$;

each $R_H$ is independently selected from the group consisting of $C_5$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $C_1$-$C_{20}$ alkoxy-2-hydroxyalkyl, $C_7$-$C_{20}$ alkylaryloxy-2-hydroxyalkyl, $(R_4)_2$N-alkyl, $(R_4)_2$N-2-hydroxyalkyl, $(R_4)_3$N-alkyl, $(R_4)_3$N-2-hydroxyalkyl, $C_6$-$C_{12}$ aryloxy-2-hydroxyalkyl,

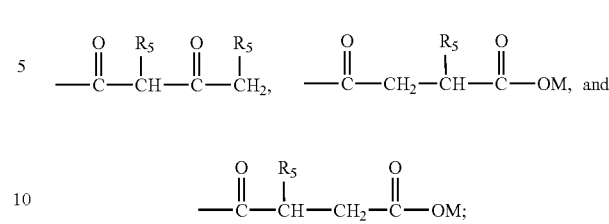

each $R_4$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, aminoalkyl, alkylaminoalkyl, dialkylaminoalkyl, piperidinoalkyl, morpholinoalkyl, cycloalkylaminoalkyl and hydroxyalkyl;

each $R_5$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $(R_4)_2$N-alkyl, and $(R_4)_3$N-alkyl;

wherein:

M is a suitable cation selected from the group consisting of $Na^+$, $K^+$, $1/2Ca^{2+}$, $1/2Mg^{2+}$, or $^+NH_jR_k$ wherein j and k are independently from 0 to 4 and wherein j+k is 4 and R in this formula is any moiety capable of forming a cation, preferably methyl and/or ethyl group or derivative;

x is from 0 to about 5;

y is from about 1 to about 5; and n is from about 1 to about 100,000;

provided that:

the Degree of Substitution for group $R_H$ is between about 0.001 and about 0.1, more preferably between about 0.005 and about 0.05, and most preferably between about 0.01 and about 0.05;

the Degree of Substitution for group $R_C$ wherein Z is H or M is between about 0 and about 2.0, more preferably between about 0.05 and about 1.0, and most preferably between about 0.1 and about 0.5;

if any $R_H$ bears a positive charge, it is balanced by a suitable anion; and two $R_4$'s on the same nitrogen can together form a ring structure selected from the group consisting of piperidine and morpholine.

The "Degree of Substitution" for group $R_H$, which is sometimes abbreviated herein "$DS_{RH}$", means the number of moles of group $R_H$ components that are substituted per anhydrous glucose unit, wherein an anhydrous glucose unit is a six membered ring as shown in the repeating unit of the general structure above.

The "Degree of Substitution" for group $R_C$, which is sometimes abbreviated herein "$DS_{RC}$", means the number of moles of group $R_C$ components, wherein Z is H or M, that are substituted per anhydrous D-glucose unit, wherein an anhydrous D-glucose unit is a six membered ring as shown in the repeating unit of the general structures above. It is understood that in addition to the required number of $R_C$ components wherein Z is H or M, there can be, and most preferably are, additional $R_C$ components wherein Z is a group other than H or M.

The production of materials according to the present invention is further defined in the Examples below.

C. Polysaccharides

"Polysaccharides" herein is meant natural polysaccharides, polysaccharide derivatives and/or modified polysaccharides. Suitable polysaccharides for use in the treating compositions of the present invention include, but are not limited to, gums, arabinans, galactans, seeds and mixtures thereof.

Suitable polysaccharides that are useful in the present invention include polysaccharides with a degree of polymerization (DP) over 40, preferably from about 50 to about 100,000, more preferably from about 500 to about 50,000, constituting saccharides preferably include, but are not limited to, one or more of the following saccharides: isomaltose, isomaltotriose, isomaltotetraose, isomaltooligosaccharide, fructooligosaccharide, levooligosaccharides, galactooligosaccharide, xylooligosaccharide, gentiooligosaccharides, disaccharides, glucose, fructose, galactose, xylose, mannose, sorbose, arabinose, rhamnose, fucose, maltose, sucrose, lactose, maltulose, ribose, lyxose, allose, altrose, gulose, idose, talose, trehalose, nigerose, kojibiose, lactulose, oligosaccharides, maltooligosaccharides, trisaccharides, tetrasaccharides, pentasaccharides, hexasaccharides, oligosaccharides from partial hydrolysates of natural polysaccharide sources and mixtures thereof.

The polysaccharides can be extracted from plants, produced by organisms, such as bacteria, fungi, prokaryotes, eukaryotes, extracted from animals and/or humans. For example, xanthan gum can be produced by *Xanthomonas campestris*, gellan by *Sphingomonas paucimobilis*, xyloglucan can be extracted from tamarind seed.

The polysaccharides can be linear, or branched in a variety of ways, such as 1-2, 1-3, 104, 1-6, 2-3 and mixtures thereof.

It is desirable that the polysaccharides of the present invention have a weight-average molecular weight in the range of from about 10,000 to about 10,000,000, more preferably from about 50,000 to about 1,000,000, most preferably from about 50,000 to about 500,000 daltons.

It is also desirable that the polysaccharide is selected from the group consisting of: tamarind gum (preferably consisting of xyloglucan polymers), guar gum, locust bean gum (preferably consisting of galactomannan polymers), and other industrial gums and polymers, which include, but are not limited to, Tara, Fenugreek, Aloe, Chia, Flaxseed, Psyllium seed, quince seed, xanthan, gellan, welan, rhamsan, dextran, curdlan, pullulan, scleroglucan, schizophyllan, chitin, hydroxyalkyl cellulose, arabinan (preferably from sugar beets), de-branched arabinan (preferably from sugar beets), arabinoxylan (preferably from rye and wheat flour), galactan (preferably from lupin and potatoes), pectic galactan (preferably from potatoes), galactomannan (preferably from carob, and including both low and high viscosities), glucomannan, lichenan (preferably from icelandic moss), mannan (preferably from ivory nuts), pachyman, rhamnogalacturonan, acacia gum, agar, alginates, carrageenan, chitosan, clavan, hyaluronic acid, heparin, inulin, cellodextrins, and mixtures thereof. These polysaccharides can also be treated (preferably enzymatically) so that the desired fractions (i.e., fractions having weight average molecular weights in the suitable range disclosed above) of the polysaccharides are isolated.

In one embodiment, the polysaccharides have a β-linked backbone.

In another embodiment, the xyloglucan polymer is the polysaccharide for use in the laundry and/or fabric care compositions of the present invention. Xyloglucan polymer is preferably obtained from tamarind seed polysaccharides. The preferred range of weight-average molecular weights for the xyloglucan polymer is from about 10,000 to about 1,000,000, more preferably from about 50,000 to about 200,000 daltons.

The natural polysaccharides can be modified with amines (primary, secondary, tertiary), amides, esters, ethers, alcohols, carboxylic acids, tosylates, sulfonates, sulfates, nitrates, phosphates and mixtures thereof. Such a modification can take place in position 2, 3 and/or 6 of the glucose unit. Such modified or derivatized polysaccharides can be included in the compositions of the present invention in addition to the natural polysaccharides.

Nonlimiting examples of such modified polysaccharides include: carboxyl and hydroxymethyl substitutions (e.g., glucuronic acid instead of glucose); amino polysaccharides (amine substitution, e.g., glucosamine instead of glucose); $C_1$-$C_6$ alkylated polysaccharides; acetylated polysaccharide ethers; polysaccharides having amino acid residues attached (small fragments of glycoprotein); polysaccharides containing silicone moieties. Suitable examples of such modified polysaccharides are commercially available from Carbomer and include, but are not limited to, amino alginates, such as hexanediamine alginate, amine functionalized cellulose-like O-methyl-(N-1,12-dodecanediamine) cellulose, biotin heparin, carboxymethylated dextran, guar polycarboxylic acid, carboxymethylated locust bean gum, caroxymethylated xanthan, chitosan phosphate, chitosan phosphate sulfate, diethylaminoethyl dextran, dodecylamide alginate, sialic acid, glucuronic acid, galacturonic acid, mannuronic acid, guluronic acid, N-acetylglucosamine, N-acetylgalactosamine, and mixtures thereof.

The polysaccharide polymers can be linear, like in hydroxyalkylcellulose, the polymer can have an alternating repeat like in carrageenan, the polymer can have an interrupted repeat like in pectin, the polymer can be a block copolymer like in alginate, the polymer can be branched like in dextran, the polymer can have a complex repeat like in xanthan. Descriptions of the polymer definitions are give in "An introduction to Polysaccharide Biotechnology", by M. Tombs and S. E. Harding, T. J. Press 1998.

D. Oligosaccharides

Suitable oligosaccharides that are useful in the present invention include oligosaccharides with a degree of polymerization (DP) of less than 20, preferably from about 1 to about 15, more preferably from about 2 to about 10, constituting monosaccharides preferably include, but are not limited to, one or more of the following monosaccharides: glucose, fructose, galactose, xylose, mannose, arabinose, rhamnose, ribose, lyxose, allose, altrose, gulose, idose, talose, and/or their derivatives. Preferred oligosaccharides have a weight-average molecular weight in the range of from about 300 to about 8000 daltons. Branched oligosaccharides are preferred over linear oligosaccharides.

Nonlimiting examples of suitable oligosaccharides can be obtained commercially from any of the suppliers—Carbomer® (fructo-oligosaccharides, levo-oligosaccharides, inulin, dextra 5000, cellosaccharides, etc.,), Grain Processing Corporation (maltodextrin), Pharmacica Biotech (Dextran® series), Palatinit (Isomalt®) and Showa Sangyo (Isomalto®-500).

E. Lignins

Lignin is one of the most abundant organic materials in nature and is the so-called "glue" in the cellulosic skeleton, which provides strength and support to trees and other plants. Lignin is also a major by-product of wood pulp processing in mills and, as such, often constitutes an environmental nuisance. Indeed, lignin is commonly isolated from the waste stream of pulp mills and typically burned in boilers for fuel. The structure of lignin can be represented by the following complex, partial molecular structure in formula (I).

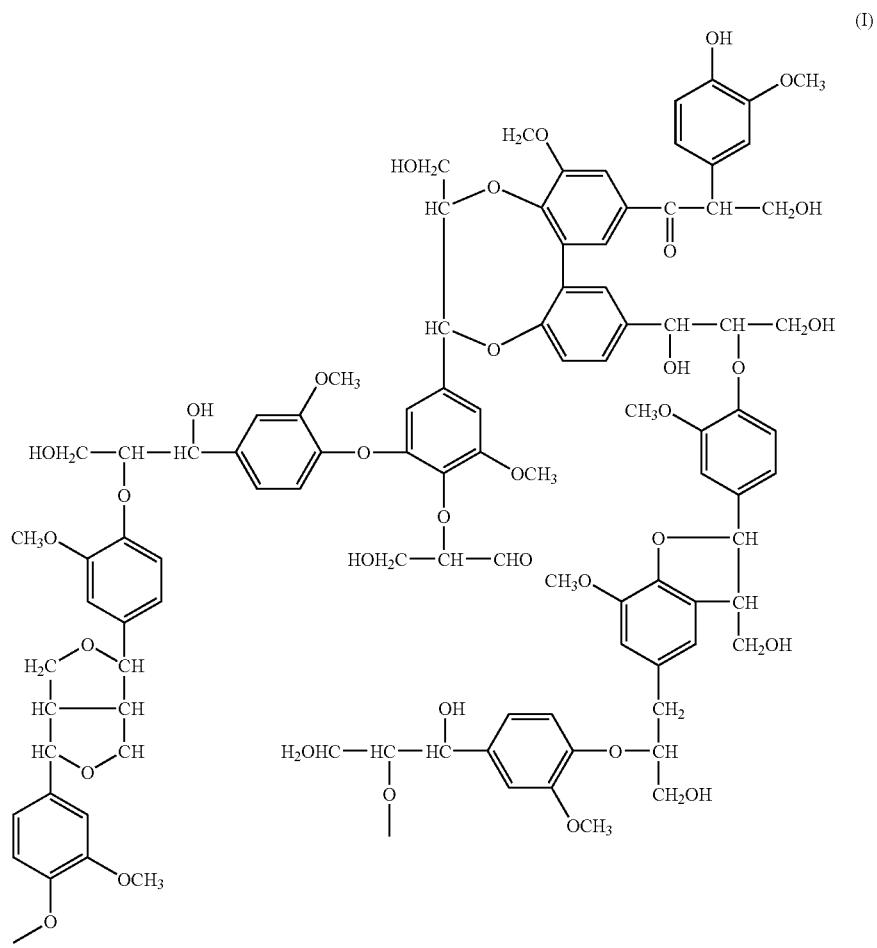

Lignin, as produced from a pulp mill, is either termed "Kraft lignin" or "lignosulfonate". Commercially available Kraft lignin is sold as INDULIN AT®. Kraft Lignin and lignosulfonate typically possess weight-average molecular weights of from about 3,000 to 15,000 g per mole and an oxygen content of about 20% to about 30% by total weight. Simplistically, these lignin derivatives are often described as complex polymers of phenylpropane monomer units linked by oxygen atoms. Kraft lignin and lignosulfonate are often described by the following empirical formulas: Kraft lignin, $C_9H_{6.7}O_{2.2}S_{0.1}(OCH_3)_{0.90}$, and Lignosulfonate, $C_9H_{8.2}O_{2.6}(OCH_3)_{0.94}$. In these formulas, the sulfonate groups, $—SO_3$, have been omitted in order to illustrate the number of oxygen molecules in the lignin structure.

For purposes of the present invention, the lignins can be used as the template and functionalized with one or more sulfonate, carboxylate and/or nonionic groups, and optionally, one or more phosphonate groups.

F. Polyamino Acids

Polyamino acids can be obtained from proteins available from plant, animal or bacteria sources. In one embodiment of the present invnetion, polyaspartate is used as the template, which is then functionalized with one or more sulfonate, carboxylate and/or nonionic groups, and optionally, one or more phosphonate groups.

G. Polyvinyl Alcohols

Polyvinylalcohols can be obtained from chemical suppliers and are useful as templates according to the present invention. For example, polyvinyl alcohols of various molecular weights and degrees of hydrolysis (i.e. hydrolysis of the residual acetate groups from the vinyl acetate moieties) are available from Aldrich Chemical Company, Milwaukee, Wis. In one embodiment of the present invention, a polyvinyl alcohol material is used as the template, which is then functionalized with one or more sulfonate, carboxylate and/or nonionic groups, and optionally, one or more phosphonate groups.

Functionalization Examples

1. Preparation of Ethoxylated/Sulfated/Carboxylated Maltodextrin.

Dextrin syrup (1800 MW) is ethoxylated in a stirred stainless steel autoclave equipped for temperature measurement and control, pressure measurement, vacuum and inert gas purging, sampling, and for introduction of ethylene oxide as a liquid. The autoclave is sealed and purged of air and the autoclave contents are heated to 80-100° C. and thylene oxide is then added to the autoclave incrementally over time while closely monitoring the autoclave pressure, temperature, and ethylene oxide flow rate. The temperature is maintained between 100 and 110° C. while the total pressure is allowed to gradually increase during the course of the reaction. After the appropriate amount of ethylene oxide required to functionalize dextrin to the desired degree of substitution has been charged to the autoclave, the temperature is increased to 110° C. and the autoclave is allowed to stir for an additional 2 hours. Vacuum is applied to remove any residual unreacted ethylene oxide. The reaction mixture is then purged with nitrogen and cooled to 5° C. using an ice bath and treated with the required amount of base catalyst and chloroacetic acid to achieve the desired degree of substitution. The ice bath is removed and the reaction is allowed to rise to room temperature. After 48 hours, the reaction is complete. Chlorosulfonic acid in the amount required to achieve the desired degree of sulfonation is slowly added using an addition funnel. The temperature of the reaction mixture is not allowed to rise above 10° C. The ice bath is removed and the reaction is allowed to rise to room temperature. After 6 hours, the reaction is complete. The reaction is again cooled to 5° C. and sodium methoxide is slowly added to neutralize the rapidly stirred mixture. The temperature of the reaction mixture is not allowed to rise above 10° C. The reaction mixture is transferred to a single neck round bottom flask. Purified water is added to the reaction mixture and the methylene chloride, methanol and some water is stripped off on a rotary evaporator at 50° C. The final product pH is checked and adjusted to about 9 using 1N NaOH or 1N HCl as needed.

2. Ethoxylated/Sulfated/Carboxylated Lignin.

Lignin, lignin phenol, or ligninsulfonate from Lignotech or Westvaco are subjected to sulfonation and carboxylation, and optionally ethoxylated, following the functionalization processes described above.

3. Ethoxylated/Sulfated/Carboxylated Sorbitol.

Sorbitol is ethoxylated, carboxylated, and sulfonated following the functionalization processes described above.

4. Sulfonated/Carboxylated Polyvinyl Alcohol.

Polyvinyl alcohol (average MW 13,000-23,000, 87-89% hydrolyzed, from Aldrich Chemical Co.) is carboxylated and sulfonated following the functionalization processes described above.

Compositions

The sulfonate and/or carboxylate materials of the present invention may be incorporated into various compositions, such as dishwashing compositions, especially automatic dishwashing compositions, laundry compositions, glass cleaners, car care compositions, etc. Nonlimiting examples of suitable compositions are disclosed in U.S. Pat. No. 5,230,835; U.S. Pat. No. 5,389,363; U.S. Pat. No. 6,482,793; U.S. Pat. No. 6,548,470; U.S. Pat. No. 6,090,767; U.S. Pat. No. 6,488,943; U.S. Pat. No. 6,573,234; WO 98/28393A1; and FR 9,504,190A1.

The compositions of the present invention may be in any physical form, such as powder, granules, liquid, paste, foam, gel and bars.

The compositions of the present invention may include one or more optional adjunct ingredients selected from the group consisting of: surfactants, builders (phosphate builders and/or citric acid builders and/or zeolite builders), divalent cations, bleaching agents (chlorine bleaching agents and/or oxygen bleaching agents), enzymes, fabric softening agents, suds boosting agents, suds suppressors or anti-foaming agents, perfume, soil release agents, fatty acids, dyes, colorants, antibacterial agents and electrolytes. In one embodiment, the composition suitable for use herein includes adjunct ingredients, such as surfactants, builder, alkalinity agents (e.g., NaOH, $K_2CO_3$), enzymes, bleaches, and anti-foaming agents (such as EO/PO copolymers).

Example Detergent Compositions (Shown in Weight % of the Composition)

Powdered or Tablet Automatic Dishwashing Detergent Compositions

| | 1 | 2 | 3 | 4 |
|---|---|---|---|---|
| STPP | 25 | 40 | 30 | 20 |
| Sodium Carbonate | 20 | — | 10 | 20 |
| Silicate | 5 | 5 | 5 | 5 |
| Low cloud point nonionic surfactant | 1 | 2 | 1 | 2 |
| Enzymes | 1 | 1 | — | 2 |
| Bleaching agent | 5 | 5 | 10 | 10 |
| Polycarboxylate | — | — | — | 2 |
| Material/Functionalized Material of the present invention | 0.5 | 1 | 1 | 2 |
| Minors & filler | balance | balance | balance | balance |

Liquid or Liquigel Automatic Dishwashing Detergent Compositions

| | 1 | 2 | 3 | 4 |
|---|---|---|---|---|
| STPP | 17 | 20 | 25 | 20 |
| Sodium Carbonate | 10 | — | — | — |
| Silicate | 5 | 5 | 4 | — |
| Low cloud point nonionic surfactant | — | — | 1 | — |
| Enzymes | — | — | 2 | 1.5 |
| Bleaching agent | 1 | 1 | — | — |
| Polycarboxylate | — | 1 | — | 1 |
| Material/Functionalized Material of the present invention | 0.5 | 1 | 1 | 1 |
| Minors & filler | balance | balance | balance | balance |

Rinse Aid Automatic Dishwashing Detergent Compositions

|  | 1 | 2 | 3 | 4 |
|---|---|---|---|---|
| Nonionic Surfactant | 30 | 25 | 25 | 40 |
| Citric acid | 1 | 1 | 2 | 3 |
| Material/Functionalized Material of the present invention | 2 | 2 | 3 | 3 |
| Solvent(s) and Solvatrope(s) | 10 | 10 | 8 | 7 |
| Minors and filler(s) | balance | balance | balance | balance |

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can made without departing from the spirit and scope of the invention. It is therefore intended to cover in the appended claims all such changes and modifications that are within the scope of this invention.

What is claimed is:

1. A method for inhibiting scale, film and/or spot formation on a surface treated with an aqueous solution containing calcium and/or magnesium ions, the method comprising contacting the surface with a wash medium comprising the aqueous solution and a composition containing a functionalized material, wherein the functionalized material is derived from non-ethylenic based or vinyl based polymers or oligomers, said functionalized material being selected from the group consisting of polyaspartates and mixtures thereof, wherein said functionalized material comprises both sulfonate moieties and carboxylate moeities and the functionalized material satisfies Test Protocol I.

2. The method according to claim 1 wherein the functionalized material has a molar ratio of sulfonate moieties to carboxylate moieties ranging from about 1:30 to about 30:1.

3. The method according to claim 2 wherein the functionalized material has a molar ratio of sulfonate moieties to carbaxylate moieties ranging from about 1:10 to about 10:1.

4. The method according to claim 1 wherein the functionalized material further comprises a nonionic functional moiety selected from the group consisting of alkoxy moieties, alkyl moieties, ester moieties and mixtures thereof.

5. The method according to claim 4 wherein the functionalized material has a molar ratio of sum of sulfonate and carboxylate moieties to nonionic moieties ranging from about 1:20 to about 20:1.

6. A composition for inhibiting scale, film and/or spot formation on a surface treated with an aqueous solution containing calcium and/or magnesium ions, the composition comprising:
   a) a functionalized material produced by a process comprising functionalizing with both carboxylate and sulfonate moieties a non-ethylenic based material or a vinyl based material selected from the group consisting of polyaspartates and mixtures thereof such that the functionalized material satisfies the Test Protocol I;
   b) a builder; and
   c) one or more adjunct ingredients.

7. The composition according to claim 6 wherein the functionalized material has a molar ratio of sulfonate moieties to carboxylate moieties ranging from about 1:30 to about 30:1.

8. The composition according to claim 7 wherein the functionalized material has a molar ratio of sulfonate moieties to carboxylate moieties ranging from about 1:10 to about 10:1.

9. The composition according to claim 7 wherein the functionalized material further comprises a nonionic functional moiety selected from the group consisting of alkoxy moieties, alkyl moieties, ester moieties and mixtures thereof.

10. The composition according to claim 9 wherein the functionalized material has a molar ratio of sum of sulfonate and carboxylate moieties to nonionic moieties ranging from about 1:20 to about 20:1.

11. The composition according to claim 6 wherein the composition is an automatic dishwashing composition or a fabric care composition.

12. The composition according to claim 6 wherein the adjunct ingredient comprises an ingredient selected from the group consisting of: builders, enzymes, bleaches, anti-foaming agents, alkalinity agents, and mixtures thereof.

* * * * *